United States Patent
Pegg et al.

(10) Patent No.: US 12,504,552 B2
(45) Date of Patent: Dec. 23, 2025

(54) FIBER REINFORCED AEROGEL COMPOSITES

(71) Applicant: Scintilex, LLC, Alexandria, VA (US)

(72) Inventors: Ian Louis Pegg, Alexandria, VA (US); Tanja Horn, Lorton, VA (US)

(73) Assignee: Scintilex, LLC, Alexandria, VA (US)

( * ) Notice: Subject to any disclaimer, the term of this patent is extended or adjusted under 35 U.S.C. 154(b) by 0 days.

(21) Appl. No.: 18/389,907

(22) Filed: Dec. 20, 2023

(65) Prior Publication Data

US 2024/0151862 A1 May 9, 2024

Related U.S. Application Data

(63) Continuation of application No. 17/336,777, filed on Jun. 2, 2021, now Pat. No. 11,994,634.

(60) Provisional application No. 63/037,206, filed on Jun. 10, 2020.

(51) Int. Cl.
| | |
|---|---|
| *G01T 1/22* | (2006.01) |
| *B28B 23/00* | (2006.01) |
| *C04B 35/76* | (2006.01) |
| *C04B 35/82* | (2006.01) |
| *C04B 38/00* | (2006.01) |
| *C04B 111/00* | (2006.01) |
| *C04B 111/80* | (2006.01) |

(52) U.S. Cl.
CPC ............ *G01T 1/22* (2013.01); *B28B 23/0006* (2013.01); *C04B 35/76* (2013.01); *C04B 35/82* (2013.01); *C04B 38/0045* (2013.01); *C04B 2111/00991* (2013.01); *C04B 2111/805* (2013.01)

(58) Field of Classification Search
CPC ........ G01T 1/22; B28B 23/0006; C04B 35/76
See application file for complete search history.

(56) References Cited

U.S. PATENT DOCUMENTS

| | | | | |
|---|---|---|---|---|
| 6,068,882 | A | * | 5/2000 | Ryu ...................... C04B 14/302 |
| | | | | 427/403 |
| 6,158,244 | A | | 12/2000 | Poco |
| 6,552,347 | B1 | | 4/2003 | Dimcovski |
| 8,080,591 | B1 | | 12/2011 | Gauthier |

(Continued)

FOREIGN PATENT DOCUMENTS

| | | |
|---|---|---|
| JP | 2005247661 A | 9/2005 |
| WO | WO-2017078888 A1 | 5/2017 |

OTHER PUBLICATIONS

Agnieszka Slosarczyk, Recent Advances in Research on the Synthetic Fiber Based Silica Aerogel Nanocomposites, nanomaterials, MDPI, Poznan University of Technology, Institute of Structural Engineering, Received: Oct. 24, 2016; Accepted: Feb. 9, 2017; Published: Feb. 16, 2017 (Year: 2017).*

(Continued)

*Primary Examiner* — Hugh Maupin
(74) *Attorney, Agent, or Firm* — Element IP, PLC

(57) ABSTRACT

Fiber reinforced aerogel composites, including a transparent composite material that contains an aerogel and fibers embedded into the aerogel and/or bonded to one or more surfaces of the aerogel, and composites that contain an aerogel tile and an assemblage of fibers embedded into the aerogel tile or bonded to the aerogel tile that are useful as Cherenkov radiators for the detection and identification of subatomic particles. Also, methods of making and using the composites.

14 Claims, 2 Drawing Sheets

(56) References Cited

U.S. PATENT DOCUMENTS

| | | | |
|---|---|---|---|
| 2006/0246806 A1 | 11/2006 | Rhine et al. | |
| 2007/0222116 A1* | 9/2007 | Gould | B29C 44/5627 |
| | | | 264/293 |
| 2008/0128631 A1* | 6/2008 | Suhami | G01T 5/02 |
| | | | 264/21 |
| 2010/0047479 A1* | 2/2010 | Voeltz | C09K 19/54 |
| | | | 252/299.01 |
| 2010/0155644 A1 | 6/2010 | Ou | |
| 2012/0128958 A1 | 5/2012 | Zeng | |
| 2013/0168556 A1 | 7/2013 | Blackburn et al. | |
| 2016/0060127 A1* | 3/2016 | Madani | C01B 33/14 |
| | | | 427/427 |
| 2016/0260760 A1 | 9/2016 | Fan | |
| 2019/0143290 A1 | 5/2019 | Bertino | |
| 2019/0390025 A1* | 12/2019 | Sakaguchi | C08J 5/043 |
| 2020/0071481 A1 | 3/2020 | Yang | |
| 2020/0231758 A1 | 7/2020 | Nakanishi | |

OTHER PUBLICATIONS

International Search Report and Written Opinion issued Oct. 28, 2021 in PCT/US2021/035419, 10 pages.

Makoto Tabata , "Transparent Tiles of Silica Aerogels for High-Energy Physics", Department of Physics, Graduate School of Science, Chiba University, 1-33 Yayoicho, Inage-ku, Chiba 263-8522, Japan, arXiv:1902.05374 (Year: 2019).

\* cited by examiner

FIBER REINFORCED AEROGEL COMPOSITES

PRIORITY

This application is a continuation of U.S. Ser. No. 17/336,777, filed Jun. 2, 2021, incorporated herein by reference in its entirety.

STATEMENT REGARDING FEDERALLY SPONSORED RESEARCH OR DEVELOPMENT

This invention was made with government support under SBIR/STTR contract DE-SC0019536 awarded by the United States Department of Energy, Office of Science. The government has certain rights in the invention.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

STATEMENT REGARDING PRIOR DISCLOSURES BY THE INVENTOR OR A JOINT INVENTOR

Not Applicable.

BACKGROUND OF THE INVENTION

Field of the Invention

The present invention relates to fiber reinforced aerogel composites, particularly those useful as Cherenkov radiators that can be employed in systems for the detection and identification of subatomic particles. Aerogel materials are used in some of these detectors because of their unique refractive index range and their optical transparency. However, as their refractive index is decreased, aerogels become less dense and less strong, leading to challenges with respect to damage in manufacturing, handling, deployment, and use. The present invention discloses the novel inclusion of fiber reinforcement into aerogel materials in such a way that their strength is significantly increased but the properties that allow their use as Cherenkov radiators are not significantly deleteriously impacted. Methods of making these improved materials, detectors and radiators including these materials, and methods of use of such detectors and radiators, are also described.

DESCRIPTION OF THE RELATED ART INCLUDING INFORMATION DISCLOSED UNDER 37 CFR 1.97 AND 1.98

Systems for the detection of subatomic particles are essential in a wide range of nuclear physics experiments such as those performed at the various particle accelerators around the world that are achieving increasingly high energies. Such detectors also have applications in the detection of special nuclear materials, radioisotope identification, container and vehicle screening, imaging of cargo containers and verification of the absence of special nuclear materials, nuclear power plant safety, cosmic ray detectors, particle astrophysics detectors, neutrino physics and astronomy, biomedicine, and medical diagnostic and therapeutic systems.

One class of detectors for subatomic particles is based on the detection of the Cherenkov radiation that such particles generate as they pass through the detector material. Cherenkov radiation is essentially a photonic shock wave that is created when charged particles travel at speeds faster than the speed of light in a given medium. The speed of light in vacuum is $c=3.0\times10^8$ meters per second but in a dielectric medium with a refractive index of n (n>1), the speed of light is reduced to $v=c/n$. Therefore, it is possible for a charged particle to travel through that dielectric medium with a speed that is greater than the speed of light in the medium. This creates electromagnetic radiation called Cherenkov radiation. The radiation is emitted at an angle $A=\cos^{-1}(c/nv)$, determined by the velocity of the charged particle and the index of refraction of the medium. The photonic shock wave front forms a conical surface carried along with the moving particle at the apex. This is exactly analogous to the shock wave created by an object traveling at supersonic speed in air.

Particles that are traveling with a speed that is less than $c/n$, or equivalently, a relative speed $\beta=v/c$ less than $1/n$, will not produce any Cherenkov radiation. For a material with refractive index n, the relative speed at the threshold is $\beta_T=1/n$. For a given momentum or energy, more massive particles travel with a lower speed than lighter particles. By selecting the refractive index of the medium appropriately, only the faster particles, with speeds greater than the threshold set by the speed of light in the medium, will emit Cherenkov radiation, making it possible to distinguish particles based on their mass. Detectors based on this principle are called threshold detectors. It is also possible to measure the angle of the Cherenkov radiation cone, A, which, with the refractive index of the medium, allows the velocity of the particle to be determined and hence its mass if the momentum or energy is known. Ring Imaging Cherenkov (RICH) detectors employ this principle. As an example, such detectors can be used to count and distinguish between pions, kaons, and protons.

Clearly, the refractive index of the material plays a crucial role in the functioning of these detectors. In order to cover the increasingly wide range of particle energies and momenta that are becoming possible, a correspondingly wide range of refractive indices is needed. To address this need a variety of gaseous, liquid, and solid materials have been employed as Cherenkov radiators. A key challenge, however, is the large gap in refractive indices between gasses and liquids. For example, at ambient temperature and pressure, the refractive index of air is about 1.0003 whereas that of water is about 1.33. Thus, the departure from the refractive index in vacuum of unity is 0.0003 and 0.33, which differ by three orders of magnitude. Pressurized gases can be used to increase the density and refractive index but this increases cost and system complexity. Aerogel materials provide a practical and viable means by which to address this gap and they have been employed successfully in several Cherenkov detectors for this purpose.

Aerogels, discovered in 1931 by Kistler, are formed by replacing the liquid in a gel with air without collapsing the structure. The first aerogels produced by Kistler used silicon dioxide as the solid phase of the gel structure but they have since been produced from a very wide range of materials. Silica gels can be formed via polymerization of silicic acid $(Si(OH)_4)$. This monomer is typically generated by acidic neutralization of sodium silicate in water. In water, polymerization of this monomer to polysilicic acid rapidly forms a solid network structure that entrains the water to form a nanoporous gel structure ("hydrogel"). However, simple drying of this gel typically causes it to collapse. Kistler argued that the surface tension between water and the gel structure causes the collapse of the pores during drying at atmospheric pressure. Kistler demonstrated that the pore structure of the gel could be maintained by drying the gels under supercritical conditions of methanol, whereby the surface tension of the solvent can be reduced to zero. Removal of entrained solvent carried out above the critical point reduces interfacial tension to zero and prevents the strong capillary forces from shrinking and collapsing the gel structure. The result is a dried gel material that is referred to as an aerogel because the pores are filled with air after drying. Typically, the pores, on the order of 10 nm in diameter, are formed by the open silica lattice structure composed of silica nanoparticles with dimensions on the order of 1-2 nm, with open porosity that can exceed 99%. This fine lattice structure creates a translucent or nearly transparent material, depending on the density. The nanoscale lattice structure and pores create very unique properties in the aerogel material. The reduced mean free path for gas molecules translates into reduced energy and mass transport, and thus makes aerogels incredible insulators. They also have high specific surface area (up to 1500 $m^2/g$ or more), low density (down to 0.003 g/cc or less), and low refractive index (down to 1.01 or less). Their low refractive index fills the gap between gases and liquids and, together with their transparency, makes aerogels very useful materials for Cherenkov radiators.

The formation of aerogels, in general, involves two major steps: the formation of a wet gel, and the drying of the wet gel to form an aerogel. The vast majority of silica aerogels utilize silicon alkoxide precursors. The most common of these are tetramethyl orthosilicate (TMOS, $Si(OCH_3)_4$), and tetraethyl orthosilicate (TEOS, $Si(OC_2H_5)_3$). However, many other alkoxides containing various organic functional groups can be used to impart different properties to the gel. Alkoxide-based sol-gel chemistry avoids the formation of undesirable salt by-products, and allows a much greater degree of control over the final product. In addition to silica, aerogels have been made from a wide range of materials including various metal oxides, including alumina, titania, and zirconia; carbon; organics; semiconducting chalcogenides; and metals.

Aerogels tend to have relatively low strength and are brittle, friable, and break easily. Various methods have been developed to improve their strength and flexibility. Polymer cross-linked aerogels and polymer coated aerogels (called X-aerogels) have increased strength and flexibility. Fiber reinforcement of aerogels also increases strength and flexibility and has been extensively studied in areas such as improved materials for thermal insulation. However, all of these modifications drastically alter the optical properties to the extent that none of these would be suitable materials for Cherenkov radiators.

Aerogel materials are used in Cherenkov detectors because of their unique refractive index range and their optical transparency. They are typically used in the form of tiles that are about 10 to 20 cm square and about 1 to 3 cm thick, though these dimensions vary; hundreds or thousands of such tiles may be used in a typical Cherenkov detector. However, as their refractive index is decreased, aerogels become less dense and less strong, leading to challenges with respect to damage in manufacturing, handling, deployment, and use. This issue becomes increasingly acute as the energy of the subatomic particles increases because Cherenkov radiator materials of correspondingly lower refractive index are required. The present invention addresses this issue and discloses the novel inclusion of fiber reinforcement into aerogel materials in such a way that their strength is significantly increased but the properties that allow for their use as Cherenkov radiators are not significantly deleteriously impacted.

BRIEF SUMMARY OF THE INVENTION

The present invention relates to fiber reinforced aerogel composite materials whose optical transmission in the visible range (380-700 nanometers, including endpoints and all values and subranges therebetween) is at least 60% of that of the aerogel without the fibers, and preferably at least 70, 80, or 90% of that of the aerogel without the fibers, particularly those useful as radiators, especially those useful as a Cherenkov radiator—i.e., an aerogel that is reinforced by fibers in such a way as to increase the strength of the aerogel while retaining the aerogel properties that allow it to be used as a Cherenkov radiator. In a preferred embodiment, the optical transparency and absorption of the composite material is generally maintained as compared to the aerogel without the fibers, and the Cherenkov radiation generated by the fibers is a small fraction of the total Cherenkov radiation generated by the overall material. As explained herein, this can be achieved by appropriate selection of the aerogel and the fiber material, preferably including the fiber dimensions, and the fiber concentration, in the aerogel. The fibers may be in any form, including the form of a mat formed by either a regular array or a random array of fibers that is typically one, or a few, fibers thick, and present in any manner within and/or on the aerogel. For example, a fiber mat may be cast into the aerogel when it is formed, and/or bonded to the surface after it is formed. When the aerogel is in the form of a tile (i.e, an essentially two dimensional material with two major opposing faces and a minor thickness, in any shape (square, circular, hexagonal, rectangular, etc), preferably with an overall shape that can be about 10 to 20 cm square and about 1 to 3 cm thick), fiber mats may be located near the upper and lower large faces of the tile, and/or near the center of the tile, and/or at several locations through the thickness of the tile. Alternatively, fibers in individual and/or mat form may be dispersed throughout the aerogel. Combinations of these configurations can be used, as can the combined or single use of fibers in mat and individual forms in any configuration within the aerogel. Fibers can be oriented in a particular direction or unoriented, and combinations can be used. In one preferred embodiment, a mat of a single layer of fibers of silicate glass or metal is cast into a silica aerogel tile near each of the upper and lower large faces. In a particularly preferred embodiment, the optical transmission of the aerogel/fiber composite material in the visible range is the same as or is reduced by some positive amount of up to or less than 1, 2, 3, 4, 5, 6, 7, 8, 9 10, 12, 14, 16, 18, 20, 22, 24, 26, 28 or 30% as compared to the aerogel without the fibers.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New fiber reinforced aerogel composite materials that are transparent in part of or all of the visible range, particularly those useful as radiators, particularly those useful as Cherenkov radiator materials, methods for fabricating them, methods of using them, and detectors and radiators comprising them, are discussed herein and make up a part of the invention. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing preferred embodiments.

Figure 1:
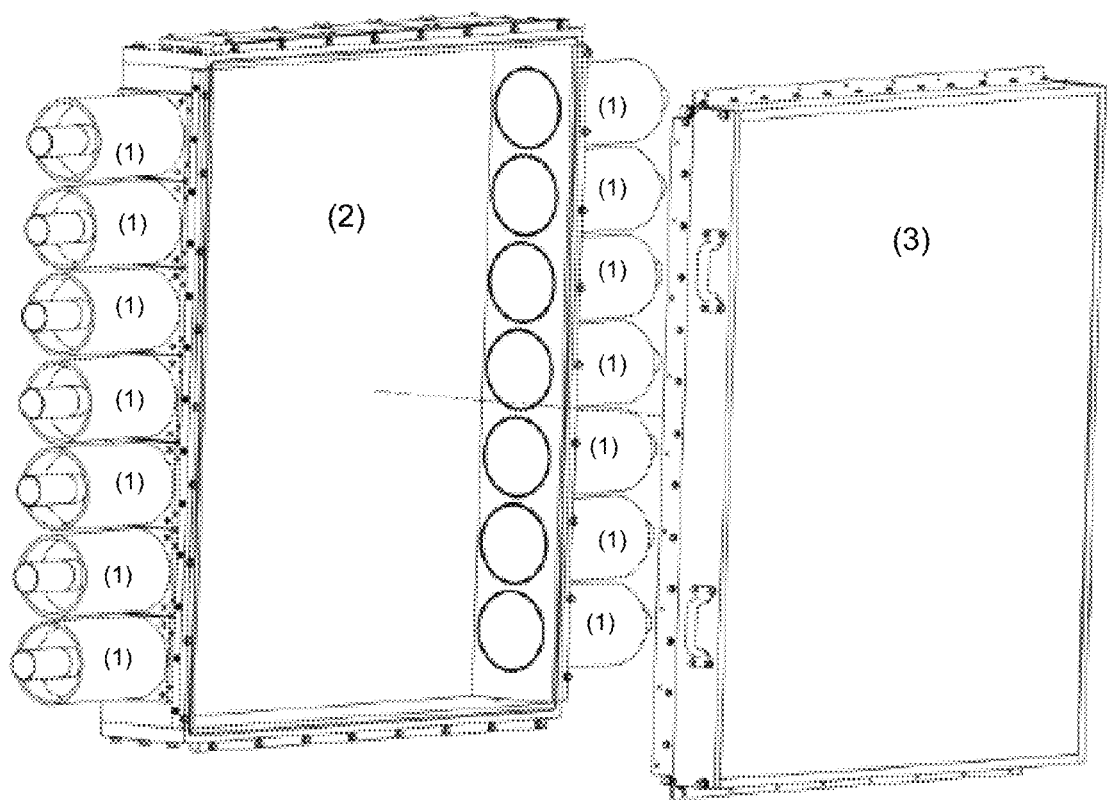
FIG. 1—FIG. 1 depicts an example of a typical threshold Cherenkov detector arrangement that consists of a tray fitted with multiple photomultiplier tubes for detection of the Cherenkov light. The example in the figure has seven photomultiplier tubes (1) on each of two opposing sides of the tray (2); more could be added on other faces. The cavity in the tray is filled with aerogel tiles (not shown). The tiles are stacked to a depth of about 10 cm. The inner walls of the cavity are coated with an optically reflective material. The lid of the tray (3) is shown removed. The charged particles that are detected are traveling predominantly perpendicular to, rather than parallel to, the plane of detector and, therefore, they travel predominantly perpendicular to the plane of the aerogel tiles. Multiple trays, each loaded with aerogel tiles of a different refractive index, are used to cover the desired energy or momentum range. This example provides one design for the purpose of illustration and it is recognized that there are many other designs for Cherenkov detectors.
Figure 2A:
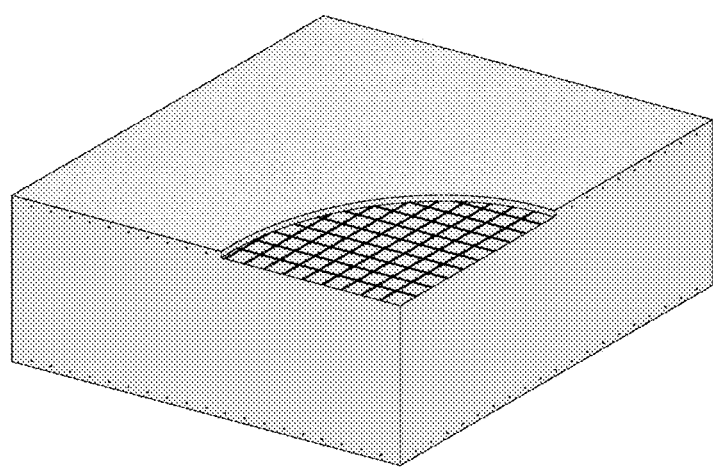
FIGS. 2A-2C—FIGS. 2A-2C depict examples of an aerogel tile with a fiber mat near each of the large faces. Examples of tiles with mats with a regular array of fibers (FIG. 2A) and with a random array of fibers (FIG. 2B) are shown. Also shown is an example of a fiber mat with a random array of continuous fibers (FIG. 2C).
Figure 2B:
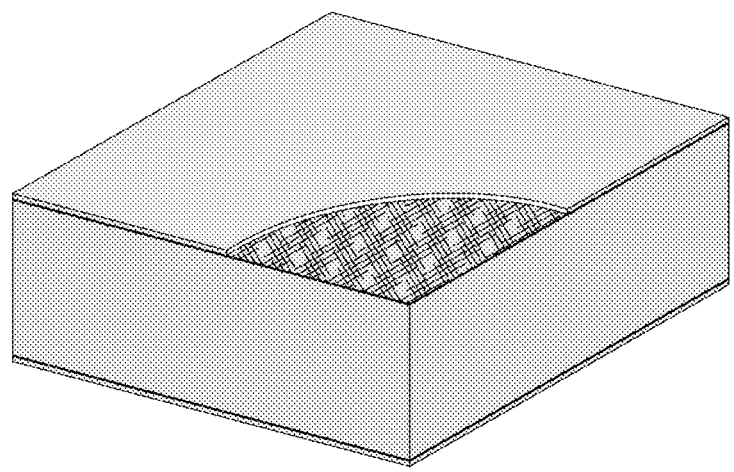
Figure 2C:
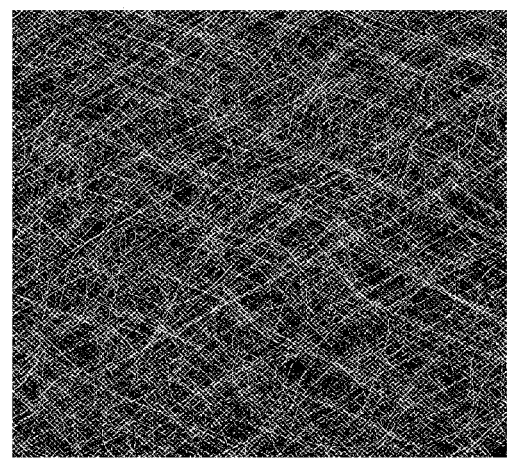

FIG. 1 depicts an example of a typical arrangement of aerogel tiles in a Cherenkov threshold detector. In a preferred embodiment, the aerogel tiles are cast with a mat of fibers located near the upper and lower large faces of the tile, as shown in FIGS. 2A-2C. The mat may be a regular array of fibers on a grid or a random array of fibers that is one, or a few, fibers thick. In this way, the fiber mat imparts maximum added strength to the aerogel tile but lies perpendicular to the photomultipliers and therefore introduces minimal interference with the path of the radiation to the photomultipliers. Alternatively, the mats may be located near the center of the tile and/or at several locations through the thickness of the tile.

In a preferred embodiment, the tile is made from silica aerogel and the mats are composed of a regular or random arrangement of continuous fibers made from silicate glass that is one, or a few, fibers thick. Suitable silicate glasses include borosilicate glass, soda-lime glass, fused quartz, alkali resistant glass, and glass types E, C, A, and AR. The use of silicate glass fibers provides good compatibility with silica aerogels and similar optical properties. In particular, silicate glasses have low optical absorption over the wavelength range from the near ultra violet to the visible, over which typical photomultipliers have their optimal response. Other useful aerogels include those of alumina, zirconia and titania, as well as resorcinol formaldehyde, phenol formaldehyde, melamine formaldehyde, cresol formaldehyde, phenol furfuryl alcohol, polyacrylamides, polyacrylonitriles, polyacrylates, polycyanurates, polyfurfural alcohol, polyimides, polystyrenes, polyurethanes, polyvinyl alcohol dialdehyde, epoxies, agar agar, and agarose. All such aerogels can be used with any fiber including all of the fibers described herein, including the optional combination of different aerogel materials and the optional combination of different fibers, all in the same material.

The optimal amount of fibers that should be incorporated into the aerogel is a result of a compromise between competing factors: more fibers will provide a greater increase in strength but will also lead to a greater modification of the properties of the material that are crucial for its successful use as a Cherenkov radiator. A greater concentration of fibers increases light absorption and light scattering within the material, which can be minimized by appropriate selection of fibers. A greater concentration of fibers also increases the amount of Cherenkov radiation that is generated from the fibers in comparison to that from the aerogel. Since the fibers have a much higher refractive index than the aerogel, they will have a lower threshold velocity than the aerogel and will generate more Cherenkov radiation per unit distance traveled by the charge particle, per unit frequency, as explained below; the Cherenkov radiation from the fibers therefore introduces an undesirable background. The total energy in the Cherenkov radiation per unit distance that the charged particle travels, per unit frequency, is given by the Frank-Tamm equation and depends on the frequency-dependent refractive index of the material. That equation can be integrated over the relatively narrow frequency range corresponding to the response of a typical photomultiplier in order to calculate the ratio of the Cherenkov radiation energy per unit length of the aerogel material to that of the fiber. As an example, for silica aerogel with a refractive index of about 1.03 and borosilicate glass fiber with a refractive index of about 1.52, the relative speed thresholds, $\beta_T=1/n$, are 0.6579 and 0.9709, respectively. In this example, at all relative speeds above about 0.1% above the threshold in the aerogel, the fiber produces less than about 300 times more Cherenkov radiation per unit length than the aerogel and this decreases as the speed increases, dropping to below 50 at relative speeds above about 0.5% above the threshold in the aerogel. Defining the quantity R as the energy in the Cherenkov radiation per unit length generated by the fiber divided by the energy in the Cherenkov radiation per unit length generated by the aerogel, R increases as the threshold in the aerogel is approached because that is where the Cherenkov radiation from the aerogel ceases. Thus, by selecting the lower limit of the energy or momentum range to be sufficiently far above the threshold (for example, corresponding to speeds greater than about 0.5% above the threshold in the aerogel), the effects of the divergence in R can be mitigated. In a preferred embodiment the dimensions and concentration of the fibers are such that that the amount of Cherenkov radiation from the fibers is no more than 1, 2, 3, 4, 5, 6, 7, 8, 9, 10, 12, 14, 16, 18, 20, 22, 24, 26, 28, 30, 35, 37, 40, 45, or 50% of the Cherenkov radiation from the aerogel/fiber composite.

Based on the forgoing discussion, the concentration and dimensions of the fibers should be small enough to compensate for the high output of Cherenkov radiation per unit length of the fibers. It is desirable to reduce the Cherenkov radiation from the fibers to about 10% or less of that from the aerogel in order to minimize the background from the fibers relative to the desired signal from the aerogel. As an example, if a fiber mat composed of a single layer of fibers with a diameter of 100 microns is embedded in a 1 cm thick aerogel tile, the path length in the aerogel is 100 times that of the aerogel. Furthermore, if the area fraction of the fibers in the fiber mat is 0.1, then the relative amount of Cherenkov radiation from the fibers is reduced by a further factor of 10. The provides a factor of 1000 reduction in the Cherenkov radiation from the fibers compared to the aerogel and, with a value of R=50, results in about 5% or less of the Cherenkov radiation coming from the fibers. Since these figures are typical of commercially available random glass fiber mats with a mass per unit area of about 25 g/m², this demonstrates that inclusion of a small number of such mats in an aerogel tile will have minimal impact on its performance as a radiator for Cherenkov detectors.

Based on the above considerations, lighter weight fiber mats with smaller fiber diameters would provide further reductions in the Cherenkov background from the fibers. Fiber diameters, whether in mats or otherwise, are preferably less than 0.3 mm, more preferably less than 0.2 mm, and even more preferably less than 0.1 mm. Minimum fiber diameters include 1, 3, 5, 7, 9, 50 and 100 microns. Glass fiber mats with mass per unit area as low as 4 g/m² and fiber diameters as small as 7 microns are commercially available and yet further reductions are possible with custom fabricated mats. It is therefore possible to decrease the interference from the Cherenkov radiation from the fibers to negligible levels.

In another preferred embodiment, the tile is made from silica aerogel and the mats are composed of a regular or random arrangement of continuous fibers made from metal that is one, or a few, fibers thick. Suitable metals include stainless steel and nickel. Metals are not optically transparent and avoid the issue of generation of Cherenkov radiation from the fibers.

In another preferred embodiment, the tile is made from silica aerogel and the mats are composed of a regular or random arrangement of continuous fibers made from a material that is not optically transparent that is one, or a few, fibers thick. Examples of such materials include carbon or coated glass fibers, such as metal-coated glass fibers. The use of fibers made materials that are not optically transparent avoids the issue of generation of Cherenkov radiation from the fibers.

In addition to the above considerations regarding reduction of the amount of Cherenkov radiation from the fibers, it is also desirable to reduce the area fraction of the fibers in the fiber mat in order to reduce light scattering. Area fractions of about 0.2 or lower, or more preferably of 0.1 or lower, are preferred from this perspective.

In one embodiment, a fiber mat is placed in the bottom of the mold that is used to produce the aerogel tile and the aerogel precursor solution is poured onto it. As the solution begins to gel, a second fiber mat is placed on top and a small additional amount of aerogel precursor solution is poured on top of the mat. Once the gelation of the aerogel is complete, the tile is taken through the conventional steps of aging and solvent removal to produce the final fiber reinforced aerogel tile. The aerogel tile will have a fiber mat located near the upper and lower large faces of the tile. The fiber mats would typically span the entire area of each of the large faces.

In another embodiment, the fiber mats are bonded to the upper and lower large faces of the aerogel tiles after they are formed. Bonding agents may include adhesives such as cyanoacrylates, butyl cyanoacrylates, and epoxies.

In another embodiment, fibers are dispersed in the aerogel precursor solution prior to forming the gel such that they are dispersed throughout the volume of the final aerogel tile.

In another embodiment, the glass fiber mats are treated with an organic solvent such as acetone to remove the organic polymer binder that is often used in the manufacturing process. The removal of the organic binders improves the bonding of the aerogel to the silicate glass fiber. The removal of the organic binders also avoids potential degradation of the organic binder in the radiation fields during use. After removal of the organic binder, if necessary, the fiber mat can be treated with a dilute alkaline solution, such as a solution of sodium hydroxide, in order to increase the hydroxyl concentration on the glass surface and improve reaction with and bonding to the aerogel matrix through the formation of siloxane bonds.

While preferred materials for elements of this invention have been described, the device is not limited by these materials. Alternative aerogel materials, such as alumina, titania, or zirconia, and alternative fiber materials, such as carbon or various polymers, and other materials, may comprise some or all of the elements of the device in various embodiments of the present invention.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

EXAMPLES

Monte Carlo simulations were performed using the GEANT4 toolkit, which provides a simulation of the passage of particles through matter and is a standard tool in the fields of high energy, nuclear, and accelerator physics, as well as studies in medical and space science. The base simulation was the Jefferson Lab SHMS Aerogel Cherenkov detector, which has been validated with beam data (published in Nucl. Instrum. Meth. A 842 (2017) 28-47). The SHMS Aerogel Cherenkov is a threshold detector that has been installed and used at Jefferson Lab since 2015. The aerogel detector and its GEANT4 model consists of an aerogel tray with an active volume of up to 110 cm×100 cm×10 cm and a diffusion box with 14 five-inch photomultiplier tubes. In the present simulation, a fiber mesh according to the present invention was implemented in the aerogel tiles with parameters that could be varied, which included the fiber diameter, fiber pitch, fiber gap, and fiber material. In the simulations, 8-10 tiles were arranged in a 50 cm×50 cm×10 cm volume in the center of the detector, with one fiber mesh layer per tile. The detector response to particles with momentum 3 GeV/c was simulated. The mesh layers were arranged parallel to the aerogel surface and perpendicular to the incoming particles. The simulations showed that the glass fibers did not significantly change the expected detector response, expressed in number of photoelectrons.

Cosmic muon tests were performed with a threshold Cherenkov aerogel detector. The detector consisted of a diffusion box and an aerogel box with photomultiplier tubes inside a metal housing mounted on the sides of the diffuser box. The aerogel box held the aerogel tiles stack. To optimize the light collection, the inner surface of the diffusion box and the aerogel box were covered with GORE reflector, which had a reflectivity ~99% over the entire spectrum. The light collection was handled by 5-in diameter photomultiplier tubes (Photonis XP4572) at operating voltage of 1500V. Eight aerogel tiles of the same refractive index (typically, 1.03) were stacked without and with one layer of fiber mesh in between. Data were taken for the control (no fiber mesh) and with a fiber mesh. The fiber mesh was a continuous glass strand veil surfacing mat with transmittance ~90%. The resulting detector performance expressed in photoelectrons was 20±2 with no mesh, and 18±2 with the glass mesh. Consequently, the glass mesh did not significantly impact detector performance, consistent with the results of the simulations.

Monte Carlo simulations were performed using GEANT4 for a focusing Cherenkov detector (Ring Imaging Cherenkov, RICH). The base simulation was the Electron-Ion Collider Aerogel RICH model with a flat source of high energy (GeV) electrons, the aerogel block (with the fiber grids), and a large flat detector behind the aerogel. The electrons were perpendicular to the aerogel entrance surface. The simulation results showed that the fibers had no significant impact on RICH detector performance, expressed in reconstructed angle (from hit point and particle trajectory) and the mean and variance of the number of photons.

Preferred embodiments of the invention described and fully enabled herein include the following, without limitation:

1. A transparent composite material, comprising:
   a. an aerogel; and
   b. fibers embedded into the aerogel and/or bonded to one or more surfaces of the aerogel.
2. The material of embodiment 1 wherein the fiber dimensions and concentration are such that the optical transmission of the composite material is at least 60% of that of the aerogel alone and preferably at least 70, 80, or 90% of that of the aerogel alone.
3. The material of embodiment 1 wherein the refractive index of the aerogel is below 1.1, preferably below 1.05.
4. The material of embodiment 1 wherein the aerogel is a silica aerogel and the fibers are made from silicate glass.
5. The material of embodiment 1 wherein the aerogel is a silica aerogel and the fibers are made from borosilicate glass.
6. The material of embodiment 1 wherein the aerogel is a silica aerogel and the fibers are made from alkali resistant silicate glass.
7. The material of embodiment 1 wherein the aerogel is a silica aerogel and the fibers are made from metal such as stainless steel or nickel.
8. The material of embodiment 1 wherein the aerogel is a silica aerogel and the fibers are made from materials that are not optically transparent such as carbon, coated glass, or metal-coated glass.
9. The material of embodiment 1 wherein the fiber diameter is less than 0.3 mm or preferably less than 0.2 mm or more preferably less than 0.1 mm.
10. The material of embodiment 1 wherein the fibers are in the form of a mat of fibers either arranged randomly or arranged in a regular grid.
11. The material of embodiment 1 wherein:
    a. the fibers are in the form of a mat that is one or a few fibers thick;
    b. the aerogel is in the form of a tile and the size and shape of the fiber mat are essentially the same as those of the large faces of the tile;
    c. a first fiber mat is embedded in the aerogel tile during its fabrication such that a mat is essentially parallel to the plane of the tile and located just below the surface of one of the large faces of the tile; and
    d. a second fiber mat, is located just below the surface of the other large face of the tile.
12. The material of embodiment 1 wherein:
    a. the fibers are in the form of a mat that is one or a few fibers thick;
    b. the size and shape of the mat are essentially the same as those of large faces of the aerogel;
    c. a first fiber mat is bonded to the surface of one of the large faces of the aerogel tile; and
    d. a second fiber mat is bonded to the surface of the other large face of the aerogel tile.
13. The material of embodiment 1 wherein:
    a. the fibers are in the form of a mat that is one or a few fibers thick;
    b. the size and shape of the mat are essentially the same as those of the large faces of the aerogel; and
    c. a fiber mat is embedded in the aerogel tile during its fabrication such that a mat is essentially parallel to the plane of a surface of the aerogel and located near the midpoint between the two large faces of the tile.
14. The material of embodiment 1 wherein the fibers are distributed through the volume of the aerogel tile.

15. A method for fabricating a transparent composite material, comprising:
   a. providing a mat of fibers that is one or a few fibers thick;
   b. locating the fiber mat in the bottom of a mold;
   c. pouring an aerogel precursor solution into the mold;
   d. allowing the aerogel precursor solution to begin to gel;
   e. placing a second fiber mat on top of the aerogel precursor in the mold after d;
   f. allowing the gelation process to complete; and
   g. removing the solvent from the aerogel after f;
   whereby the strength of the aerogel is increased by the fibers, and wherein the dimensions and concentration of the fibers are such that that the amount of Cherenkov radiation from the aerogel substantially exceeds the amount of Cherenkov radiation from the fibers 16. A Cherenkov radiator for the detection of subatomic particles by conversion of some of the particle energy into Cherenkov radiation, comprising:
   a. an aerogel in the form of a tile; and
   b. an assemblage of fibers embedded into the aerogel tile and/or bonded to the aerogel tile;
   whereby the strength of the aerogel tile is increased relative to an identical aerogel tile without fibers but the fiber material, dimensions, and concentration are such that that the amount of Cherenkov radiation from the aerogel substantially exceeds the amount of Cherenkov radiation from the fibers.

17. The radiator of embodiment 16 wherein the fiber material, dimensions, and concentration are such that the optical transmission of the aerogel tile with the fibers is at least 60% of that of the aerogel tile alone and preferably at least 70, 80, or 90% of that of the aerogel tile alone.

18. The radiator of embodiment 16 wherein the refractive index of the aerogel is below 1.1, or preferably below 1.05.

19. The radiator of embodiment 16 wherein the aerogel is a silica aerogel and the fibers are made from silicate glass.

20. The radiator of embodiment 16 wherein the aerogel is a silica aerogel and the fibers are made from borosilicate glass.

21. The radiator of embodiment 16 wherein the aerogel is a silica aerogel and the fibers are made from alkali resistant silicate glass.

22. The radiator of embodiment 16 wherein the aerogel is a silica aerogel and the fibers are made from metal such as stainless steel or nickel.

23. The radiator of embodiment 16 wherein the aerogel is a silica aerogel and the fibers are made from materials that are not optically transparent such as carbon, coated glass, or metal-coated glass.

24. The radiator of embodiment 16 wherein the fiber diameter is less than 0.3 mm or preferably less than 0.2 mm or more preferably less than 0.1 mm.

25. The radiator of embodiment 16 wherein the fibers are in the form of a mat of fibers either arranged randomly or arranged in a regular grid.

26. The radiator of embodiment 16 wherein:
   a. the fibers are in the form of a mat that is one or a few fibers thick;
   b. the size and shape of the fiber mat are essentially the same as those of the large faces of the tile;
   c. a fiber mat is embedded in the aerogel tile during its fabrication such that a mat is essentially parallel to the plane of the tile and located just below the surface of one of the large faces of the tile; and
   d. a second fiber mat, similar to the first, is located just below the surface of the other large face of the tile.

27. The radiator of embodiment 16 wherein:
   a. the fibers are in the form of a mat that is one or a few fibers thick;
   b. the size and shape of the fiber mat are essentially the same as those of the large faces of the tile;
   c. a fiber mat is bonded to the surface of one of the large faces of the aerogel tile; and
   d. a second fiber mat, similar to the first, is bonded to the surface of the other large face of the aerogel tile.

28. The radiator of embodiment 16 wherein:
   a. the fibers are in the form of a mat that is one or a few fibers thick;
   b. the size and shape of the fiber mat are essentially the same as those of the large faces of the tile; and
   c. a fiber mat is embedded in the aerogel tile during its fabrication such that a mat is essentially parallel to the plane of the tile and located near the midpoint between the two large faces of the tile.

What is claimed is:

1. A transparent composite material, comprising:
an aerogel; and
fibers embedded into the aerogel and/or bonded to one or more surfaces of the aerogel, wherein:
   a. the fibers are in the form of a mat that is one or a few fibers thick;
   b. the aerogel is in the form of a tile and the size and shape of the fiber mat are essentially the same as those of the large faces of the tile;
   c. a first fiber mat is embedded in the aerogel tile during its fabrication such that a mat is essentially parallel to the plane of the tile and located just below the surface of one of the large faces of the tile; and
   d. a second fiber mat, is located just below the surface of the other large face of the tile.

2. The material of claim 1, wherein the refractive index of the aerogel is below 1.1.

3. The material of claim 1, wherein the aerogel is a silica aerogel and the fibers are made from silicate glass.

4. The material of claim 1, wherein the aerogel is a silica aerogel and the fibers are made from metal.

5. The material of claim 1, wherein the aerogel is a silica aerogel and the fibers are made from materials that are not optically transparent.

6. The material of claim 1, wherein the fiber diameter is less than 0.3 mm.

7. The material of claim 1, wherein the fibers are in the form of a mat of fibers and are either arranged randomly or arranged in a regular grid.

8. The material of claim 1, wherein the fiber dimensions and concentration are such that the optical transmission of the composite material is at least 60% of that of the aerogel alone.

9. A transparent composite material, comprising:
an aerogel; and
fibers embedded into the aerogel and/or bonded to one or more surfaces of the aerogel, wherein:
   a. the fibers are in the form of a mat that is one or a few fibers thick;
   b. the size and shape of the mat are essentially the same as those of large faces of the aerogel;
   c. a first fiber mat is bonded to the surface of one of the large faces of the aerogel; and d. a second fiber mat is bonded to the surface of the other large face of the aerogel.

10. A transparent composite material, comprising:
an aerogel; and
fibers embedded into the aerogel and/or bonded to one or more surfaces of the aerogel, wherein:
a. the fibers are in the form of a mat that is one or a few fibers thick and the aerogel is in the form of a tile;
b. the size and shape of the mat are essentially the same as those of the large faces of the aerogel tile; and
c. a fiber mat is embedded in the aerogel tile during its fabrication such that a mat is essentially parallel to the plane of a surface of the aerogel and located near the midpoint between the two large faces of the tile.

11. A Cherenkov radiator for the detection of subatomic particles by conversion of some of the particle energy into Cherenkov radiation, comprising:

a. an aerogel tile; and
b. an assemblage of fibers embedded into the aerogel tile or bonded to the aerogel tile;
whereby the strength of the aerogel tile is increased but the fiber material, dimensions, and concentration are such that that the amount of Cherenkov radiation from the aerogel substantially exceeds the amount of Cherenkov radiation from the fibers.

12. The radiator of claim 11, wherein the fiber material, dimensions, and concentration are such that the optical transmission of the aerogel tile with the fibers is at least 60% of that of the aerogel tile alone.

13. The radiator of claim 11, wherein the refractive index of the aerogel is below 1.1.

14. The radiator of claim 11, wherein the aerogel is a silica aerogel and the fibers are made from silicate glass.

* * * * *